Nov. 22, 1932.  C. H. SCHOL  1,888,394
APPARATUS FOR OBTAINING A HIGHLY POROUS, CELLULAR,
LIGHT MATERIAL FROM BLAST FURNACE SLAG
Filed May 20, 1930
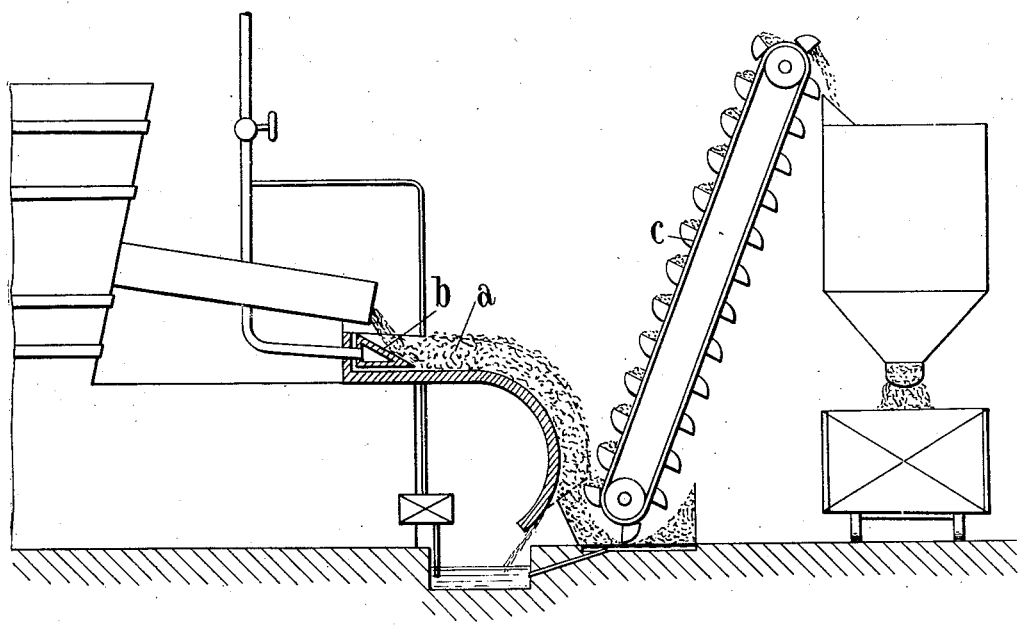
C. H. Schol
INVENTOR Patented Nov. 22, 1932

1,888,394

UNITED STATES PATENT OFFICE

CARL HEINRICH SCHOL, OF ALLENDORF, GERMANY

APPARATUS FOR OBTAINING A HIGHLY POROUS, CELLULAR, LIGHT MATERIAL FROM BLAST FURNACE SLAG

Application filed May 20, 1930, Serial No. 454,163, and in Germany January 23, 1930.

The process of granulating various kinds of liquid furnace material, such as for instance blast furnace slag, in a channel containing cold water is known. It consists in leading the liquid furnace material into a channel, in which a strong current of cold water is passing, in order to plunge it and to cool it down as quickly as possible, so that it solidifies into shape of fine grains that sink to the bottom and become saturated with water.

The present invention relates to a process according to which a highly porous, coarse-grained, light, dry or nearly dry material for construction or insulation purposes is obtained from blast furnace slag, and other liquid furnace material. Owing to its light weight and its porous and cellular structure, this product can serve a great many purposes and is especially used in the new kind of buildings.

The present process for obtaining this product consists in leading the liquid furnace material into a trough or channel of a special structure through which flows a small current of any kind of suitable liquid, e. g. of warm or cold water or of any other liquid or liquor containing chemical substances especially suited to the purpose.

At the entrance of the trough or channel the vapour arising from the liquid penetrates into the liquid furnace material and disintegrates the same into a highly porous, cellular mass, which solidifies in this state. The current of liquid pushes this swollen-up mass forward only a short way. On account of the great heat of the incandescent porous mass the liquid evaporates very quickly, so that it is unable to drive the latter to the elevator or other transporting device.

The present invention avoids the aforegoing defect by a new special construction of the channel $a$ which guides the artificial pumice stone. As is shown for example in the figure of the drawing, this channel has only a very short straight part, the remaining part of the channel being downwardly curved, the degree of inclination increasing proportionately to the diminution of the furthering effect of the liquid. The circular inclination of the channel as shown in the drawing can vary in any other way.

At the entrance of the liquid furnace material into the channel a specially shaped and sufficiently fire-proofed inclined plane $b$ is placed, in order to receive the fall of the said liquid furnace material which then flows down to the bottom of the channel $a$. In order to prevent a too rapid wearing the inclined plane $b$ can be continuously cooled down inside by means of a liquid which in turn is in this way warmed before use.

As soon as the incandescent liquid furnace material has reached the bottom of the channel $a$ the liquid required for the swelling of the material can be brought from under the inclined plane, or can already be led to the top of the inclined plane simultaneously with the fall of the liquid material. In this way its swelling begins even before the material has reached the bottom of the channel.

Owing to the constantly increasing inclination of the curved part of the channel $a$ the swollen porous pumice mass slides down of its own accord and falls into a suitable transporting device, e. g. an elevator $s$. The channel however is continued a little way behind the fall of the mass, in order to separate from the latter possible quantities of liquid which might still cling to the surface of the groove, flowing along the same. This liquid can be used again.

Should any liquid reach the pit, it may be removed therefrom by the open construction of the bottom of the pit through which it can filter and be used again. The cellular, porous and light pumice material obtained in this manner may be conducted to any suitable breaking or sorting device and may be broken or sorted into the current grainings industrially used.

What I claim is:

1. Apparatus for producing highly porous, cellular material adapted for constructional and insulating purposes from liquid blast furnace slag or the like material consisting of a trough for guiding the slag having a short straight part and having the remaining part downwardly curved, said parts forming a solid bottom, and means for producing a stream of liquid in the trough along said bottom, the downwardly curved bottom portion of the trough being bent back at its end away from the line of fall of the material in order to separate as much liquid as possible from the latter.

2. Apparatus for producing highly porous, cellular material adapted for constructional and insulating purposes from liquid blast furnace slag or the like material consisting of a trough for guiding the slag having a short straight part and having the remaining part downwardly curved, said parts forming a solid bottom, and means for producing a stream of liquid in the trough along said bottom, the inclination of the trough increasing gradually and proportionally to the diminution of the furthering effect of the liquid and the downwardly curved portion of the bottom being bent back at its end away from the line of fall of the material in order to separate as much liquid as possible from the latter.

3. Apparatus for producing highly porous, cellular material adapted for constructional and insulating purposes from liquid blast furnace slag or the like material consisting in a trough for guiding the slag having a short straight part, the remaining part being downwardly curved, said parts forming a solid bottom, means for producing a stream of liquid in the trough along said bottom, a receptacle for receiving the cellular material passing along said downwardly curved part, the end of the downwardly curved part being bent back away from the line of fall of the material, in order to separate as much liquid as possible from the cellular material, a fire-proof inclined surface at the receiving end, and inside of, said straight portion of the trough for breaking the fall of the said material, a pit underneath said backwardly bent end of the trough for receiving the liquid flowing along the trough, and an open bottom in the aforesaid receptacle for the cellular material through which liquid clinging to the cellular material may filter into a space out of contact with said material.

4. Apparatus for producing highly porous, cellular material adapted for constructional and insulating purposes from liquid blast furnace slag or the like material consisting in a trough for guiding the slag having a short straight bottom part, the remaining bottom part being downwardly curved and increasing in inclination gradually and proportionally to the diminution of the furthering effect of the liquid, a receptacle for receiving the cellular material passing along said downwardly curved part, the end of the downwardly curved part being bent back away from the line of fall of the material, in order to separate as much liquid as possible from the cellular material, a fire-proof liquid-cooled inclined surface at the receiving end, and inside of, said straight portion of the trough for breaking the fall of the incandescent material, a pit underneath said backwardly bent end of the trough for receiving the liquid flowing along the bottom of the trough, and an open bottom in the aforesaid receptacle through which liquid clinging to the cellular material may filter into a space out of contact with said material and communicating means for the said filtered liquid between said space and said pit.

5. Apparatus for producing highly porous, cellular material adapted for constructional and insulating purposes from liquid blast furnace slag or the like material consisting of a trough for guiding the slag, having a short straight part and having the remaining part downwardly curved, said parts forming a solid continuous bottom, an inclined member of fire-proof material at the receiving end of the short straight part of the trough for breaking the fall of the liquid slag material into the trough, and means for introducing liquid into the trough, the inclination of the downwardly curved portion of the trough increasing gradually and proportionally to the diminution of the furthering effect of the liquid and the end of said downwardly curved portion being bent back away from the line of fall of the material in order to separate as much liquid as possible from the latter.

In testimony whereof I have signed my name to this specification.

CARL HEINRICH SCHOL.